US010761307B2

(12) United States Patent
Miller (10) Patent No.: US 10,761,307 B2
(45) Date of Patent: Sep. 1, 2020

(54) BYPASS OPTICAL SWITCH AND METHODS

(71) Applicant: Raytheon Company, Waltham, MA (US)

(72) Inventor: Kirk A. Miller, Dallas, TX (US)

(73) Assignee: Raytheon Company, Waltham, MA (US)

(*) Notice: Subject to any disclaimer, the term of this patent is extended or adjusted under 35 U.S.C. 154(b) by 76 days.

(21) Appl. No.: 15/370,766

(22) Filed: Dec. 6, 2016

(65) Prior Publication Data

US 2018/0157018 A1    Jun. 7, 2018

(51) Int. Cl.
*G02B 23/00* (2006.01)
*G02B 17/00* (2006.01)
(Continued)

(52) U.S. Cl.
CPC ....... *G02B 17/0896* (2013.01); *G02B 7/1827* (2013.01); *G02B 17/0694* (2013.01);
(Continued)

(58) Field of Classification Search
CPC ........... G02B 7/003–005; G02B 7/1821–1828; G02B 15/02–12; G02B 17/023; G02B 17/06; G02B 17/0626–0663; G02B 17/0694; G02B 17/0804; G02B 17/082; G02B 17/0896; G02B 23/02; G02B 23/06; G02B 23/16; G02B 26/0816; G02B 17/0808; H04N 5/2254; H04N 5/2259
See application file for complete search history.

(56) References Cited

U.S. PATENT DOCUMENTS 4,469,396 A    9/1984  Neil
4,567,782 A *  2/1986  Speicher ................. F16H 21/12
                                                    74/519
(Continued)

FOREIGN PATENT DOCUMENTS

WO    WO 2010/148272 A1    12/2010

OTHER PUBLICATIONS

International Search Report for International Application No. PCT/US2017/055176 dated Jan. 11, 2018, 17 pages.
(Continued)

*Primary Examiner* — Thong Q Nguyen (57) ABSTRACT

An optical system (e.g., a telescope) comprising an optical assembly that reflects and refracts light rays through a single window about an optical path to a detector. A field-of-view switch assembly comprises a mount, having a pair of diverter mirrors, movably coupled to the optical assembly and being selectively movable between a non-bypass position and a bypass position. The diverter mirrors bypass a first field-of-view and translate a second field-of-view (both through the single window) when moved from the non-bypass position to the bypass position to redirect the optical path. The diverter mirrors straddle the optical path in the non-bypass position. A dynamic shutter shields the second diverter mirror and exposes the second diverter mirror when moved between non-bypass and bypass positions. A four-bar linkage mechanism rotates the mount with an on-board motor and a torsional shaft to absorb impact forces. Associated methods are provided for facilitating switching between fields-of-view.

23 Claims, 9 Drawing Sheets

(51) Int. Cl.
  *G02B 17/08* (2006.01)
  *G02B 23/06* (2006.01)
  *G02B 23/16* (2006.01)
  *G02B 17/06* (2006.01)
  *H04N 5/225* (2006.01)
  *G02B 7/182* (2006.01)

(52) U.S. Cl.
  CPC ......... *G02B 17/0808* (2013.01); *G02B 23/06* (2013.01); *G02B 23/16* (2013.01); *H04N 5/2259* (2013.01)

(56) References Cited

U.S. PATENT DOCUMENTS

| | | | |
|---|---|---|---|
| 4,763,991 A * | 8/1988 | Klotz, Jr. | G02B 7/004 359/872 |
| 4,877,317 A * | 10/1989 | Gibbons | G02B 17/0808 359/421 |
| 5,009,494 A * | 4/1991 | Iossi | G02B 17/0636 359/366 |
| 5,227,923 A | 7/1993 | Kebo | |
| 5,477,395 A | 12/1995 | Cook | |
| 5,907,433 A | 5/1999 | Voigt et al. | |
| 6,084,727 A | 7/2000 | Cook | |
| 6,441,957 B1 * | 8/2002 | Teuchert | G02B 17/0621 359/364 |
| 6,970,286 B1 | 11/2005 | Kunick | |
| 7,099,077 B2 * | 8/2006 | Cook | G02B 13/22 359/365 |
| 7,180,659 B2 * | 2/2007 | Doittau | G02B 17/0652 359/364 |
| 8,154,712 B2 | 4/2012 | Kunick | |
| 8,427,744 B2 | 4/2013 | Cook | |
| 9,310,601 B1 | 4/2016 | Jackson et al. | |
| 2008/0042500 A1 * | 2/2008 | Horng | H02K 5/161 310/51 |
| 2008/0143198 A1 * | 6/2008 | Bi | H02K 1/187 310/51 |
| 2011/0188139 A1 * | 8/2011 | Bentley | G02B 15/02 359/859 |
| 2014/0253999 A1 | 9/2014 | Hegg | |

OTHER PUBLICATIONS

International Preliminary Report on Patentability for International Application No. PCT/US2017/055176 dated Jun. 20, 2019, 10 pages.

* cited by examiner

BYPASS OPTICAL SWITCH AND METHODS

GOVERNMENT LICENSE RIGHTS

This invention was made with government support. The government has certain rights in the invention.

BACKGROUND

There are numerous applications for optical imaging systems that require a high sensitivity narrow field-of-view telescope for detection and discrimination purposes, for example. However, it is also frequently desirable to additionally capture a wide field-of-view in order to achieve higher resolution imaging. Typically, switching between fields-of-view involves the use of moving parts, such as mounts, laterally movable lenses (to provide "zoom") or other movable optical components, such as a field-of-view switch.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example there is provided an optical system comprising an optical assembly that reflects light rays, from a single window, through an optical path to a detector of the system (e.g., a detector such as a camera for receiving and transmitting signal associated with the light rays). The optical system can comprise a field-of-view switch assembly comprising a mount movably coupled to the optical assembly and being selectively movable between a non-bypass position and a bypass position. The field-of-view switch assembly can comprise a first diverter mirror attached to the mount and a second diverter mirror attached to the mount. The first and second diverter mirrors are configured to optically pass a first field-of-view and reflect/translate a second field-of-view when moved from the non-bypass position to the bypass position. Thus, the field-of-view switch assembly is configured to redirect the optical path to the detector, such as a camera. Both the first field-of-view and the second field-of-view are through the single window of the optical system.

In some examples, one of the fields-of-view is a narrow field of view, and the other of the field-of-view is a wide field-of-view. In one example, the first and second diverter mirrors straddle the optical path when in the non-bypass position. In one example, at least one of the first and second diverter mirrors is positioned within the optical path when in the bypass position to translate the second field-of-view. In one example, reflective surfaces of the first and second diverter mirrors (when in the bypass position) are positioned to vertically translate and redirect the optical path approximately 180 degrees relative to the redirected optical path and the detector.

In one example, the optical system further comprises a dynamic shutter movably coupled to the mount. The dynamic shutter can shield a reflective surface of the second diverter mirror from creating stray light rays when in the non-bypass position, and the dynamic shutter can expose the reflective surface when in the bypass position (to redirect the optical path).

In one example, the field-of-view switch assembly further comprises a support structure to which the mount is pivotally coupled to. An on-board motor can be attached to the support structure and can be configured to actuate the mount between the non-bypass position and the bypass position. A torsional shaft can be operably coupled to the on-board motor and configured to rotate the mount when actuated by the on-board motor. Thus, the torsional shaft absorbs impact forces acting on the on-board motor, which can facilitate operation of the on-board motor at maximum power capacity to minimize switching duration times of the mount and attached diverter mirrors.

In one example there is provided a method for facilitating switching between a first field-of-view and a second field-of-view, both through a single window, with a field-of-view switch assembly. The method can comprise facilitating translation of light rays to a detector (e.g., a camera) of an optical system, wherein an optical path is defined by the light rays through a single window. The method can comprise facilitating switching between a first field-of-view and a second field-of-view with the field-of-view switch assembly of the optical system to redirect the optical path.

Figure 1A:
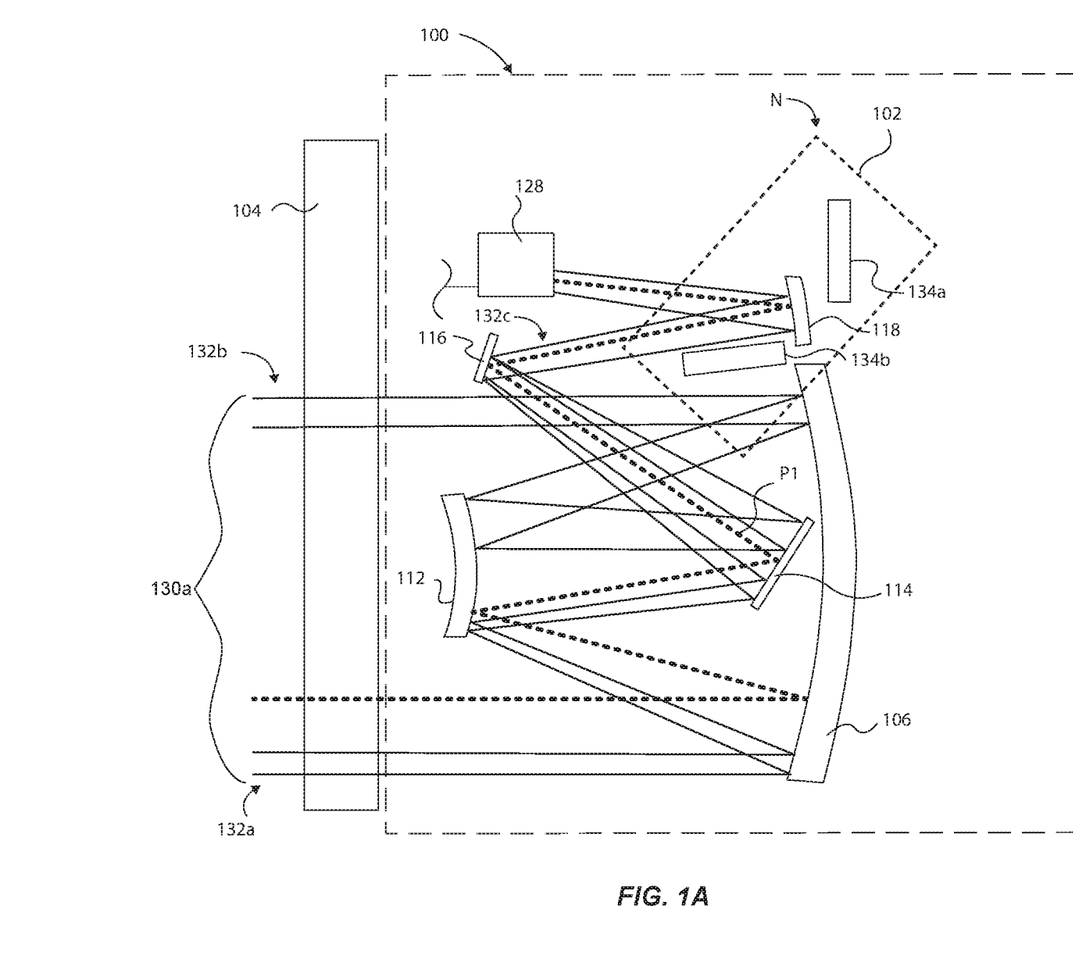
FIG. 1A is a diagram illustrating components of a reflective telescope having a field-of-view switch assembly in a non-bypass position in accordance with an example of the present disclosure.
Figure 1B:
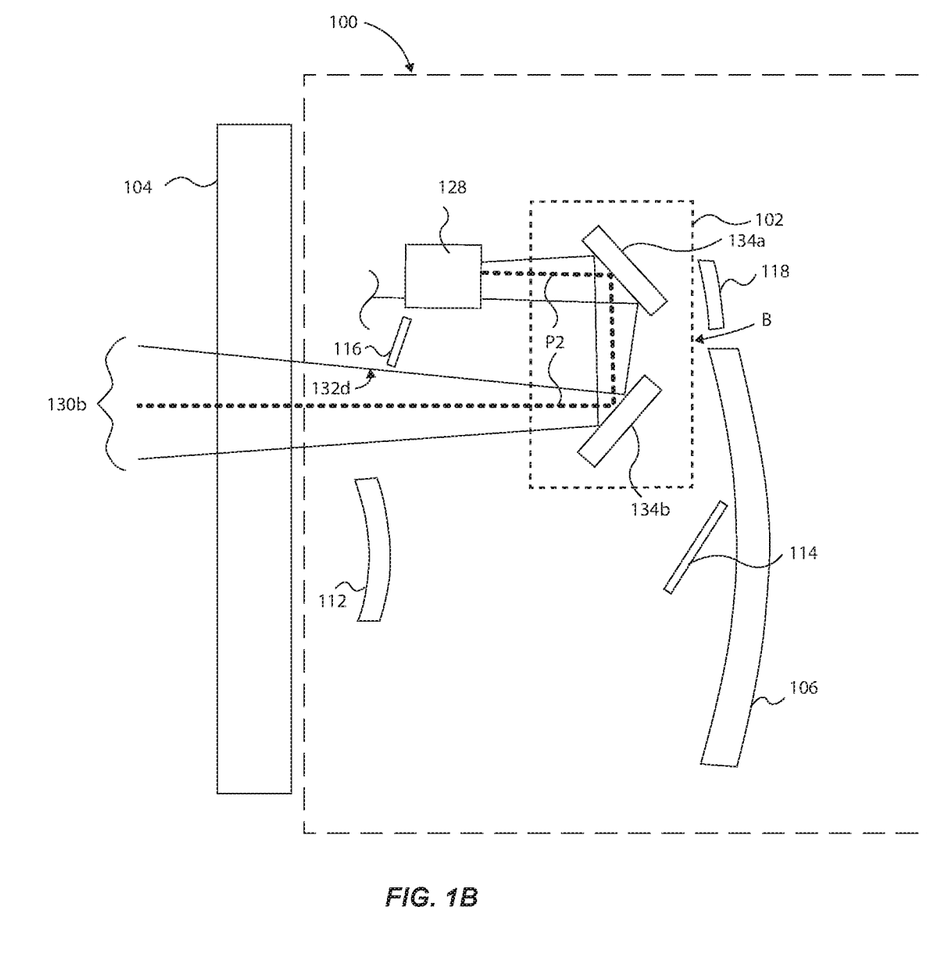
FIG. 1B is a diagram illustrating components of the reflective telescope of FIG. 1A, having a field-of-view switch assembly in a bypass position in accordance with an example of the present disclosure.

FIG. 1A is a diagram illustrating an optical system 100 (e.g., a reflective telescope) having a field-of-view switch assembly 102 in a normal, non-bypass position (first position) N, and FIG. 1B is a diagram illustrating the optical system 100 having the field-of-view switch assembly 102 in a bypass position (second position) B. The optical system 100 includes a single window 104, a curved primary mirror 106, curved secondary mirror 112, a first flat mirror 114, a second flat mirror 116, a curved tertiary mirror 118, and a camera 128. In one example, these mirrors can be part of a fore optics assembly of a high-magnification telescope. While this telescope uses three powered mirrors and two flat mirrors, other telescope forms which use 2, 4 or 5 powered mirrors and any number of flat mirrors, could use this bypass approach.

With continued reference to FIG. 1A, incident beams (i.e., light) 132a and 132b from an object (not shown) can be passed through the single aperture or window 104 and are associated with a narrow field-of-view 130a (as the field-of-view switch assembly 102 is shown as being in the normal, non-bypass position (or first position) N). Beams 132a and 132b can be caused to impinge or be incident upon the primary mirror 106. Stated differently, the primary mirror 106, can be situated relative to the window 104 to receive the beams 132a and 132b, respectively. Beams 132a can then be reflected by the primary mirror 106, and concurrently, beams 132b can be reflected by the first flat mirror 114. For illustration and clarity purposes, a pair of ray lines is used to represent beams 132a-d (see also FIG. 1B).

From the primary mirror 106, the beams 132a and 132b can be caused to be incident on the secondary mirror 112, which reflects beams 132a and 132b to the first flat mirror 114, which then reflects beams 132a and 132b to the second flat mirror 116. From the second flat mirror 116 (e.g., a fold mirror), beams 132a and 132b can be caused to converge/fold and can be reflected as beams 132c, which can be caused to be incident on the tertiary mirror 118. The tertiary mirror 118 can reflect beams to the camera 128, for example, that can receive and transmit signals associated with the beams 132c to a computer system and/or displays (not shown) in a known manner for processing the signals. Alternatively, box 128 can be a sub-assembly that includes one detector or a multiplicity of other sensors that receives or that is configured to receive said signals. In any event, the detector can be any suitable imaging detector or sensor for a telescope, such as a CCD, CMOS, photodiode array, light emitting device or other suitable imaging sensor capable of receiving and transmitting signals pertaining to light rays.

As shown on FIG. 1A, an optical path P1 defines (in part) the path of the reflected beams 132c to the camera 128, as shown by the dashed lines. For purposes of illustration, the beams 132c are shown as being directly received by the camera 128 in FIGS. 1A and 1B (and 4A and 4B); however, the beams 132c can be directed to other mirrors or other devices before being received by the camera 128, for instance, depending on the particular application and type of detector and system employed.

The field-of-view switch assembly 102 of FIG. 1A (in the normal, non-bypass position N) further comprises a first diverter mirror 134a and a second diverter mirror 134b. As illustrated, the diverter mirrors 134a and 134b do not receive, and are not reflective of, any of the beams 132a-c of FIG. 1A, as these are in a stowed or inactive configuration (e.g., see FIGS. 3A and 4A). As further discussed below, in one example, in the normal, non-bypass position N, the diverter mirrors 134a and 134b can be situated so as to straddle the optical path P1. That is, the diverter mirrors 134a and 134b can be spatially positioned from each other on either side of the beams 132c (i.e., the optical path P1) (see e.g., FIG. 4A).

With specific reference to FIG. 1B, the field-of-view switch assembly 102 is shown as being in the bypass position B, which accommodates a wide field-of view 130b. Notably, the wide field-of view 130b and the narrow field-of view 130a (FIG. 1A) are directed through the same single aperture or window 104. In this way, incident beams 132d from an object (not shown) are passed through the single window 104 and are associated with the wide field-of view 130b. With the diverter mirrors 134a and 134b repositioned from a stowed position to an active deployed position, beams 132d can be caused to be incident upon, and reflected by the second diverter mirror 134b and subsequently incident upon the first diverter mirror 134a. The first diverter mirror 134a then reflects beams 132d to the camera 128 for receiving and transmitting signals associated with the beams 132d. As illustrated, the diverter mirrors 134a are in a deployed or active configuration (see e.g., FIGS. 3B and 4B), and thereby shield or block the beams 132c (FIG. 1) that would otherwise be reflected from the tertiary mirror 118. Thus, the beams 132d comprise or are directed through an optical path P2, as illustrated by the dashed lines, which is different from the optical path P1 of FIG. 1A with the diverter mirrors 134a and 134b in a stowed position.

As further discussed below, when the field-of-view switch assembly 102 is moved from the normal, non-bypass position N (FIG. 1A) to the bypass position B (FIG. 1B), the optical path P1 is redirected (from the same single window 104) by the switch assembly 102 to the camera 128. In addition, the field-of-view switch assembly 102 is configured to vertically translate the optical path such that the optical path is redirected approximately 180 degrees when in the bypass position (such as illustrated by the pair of 90 degree symbols on the optical path P2 of FIG. 4B).

Figure 2A:
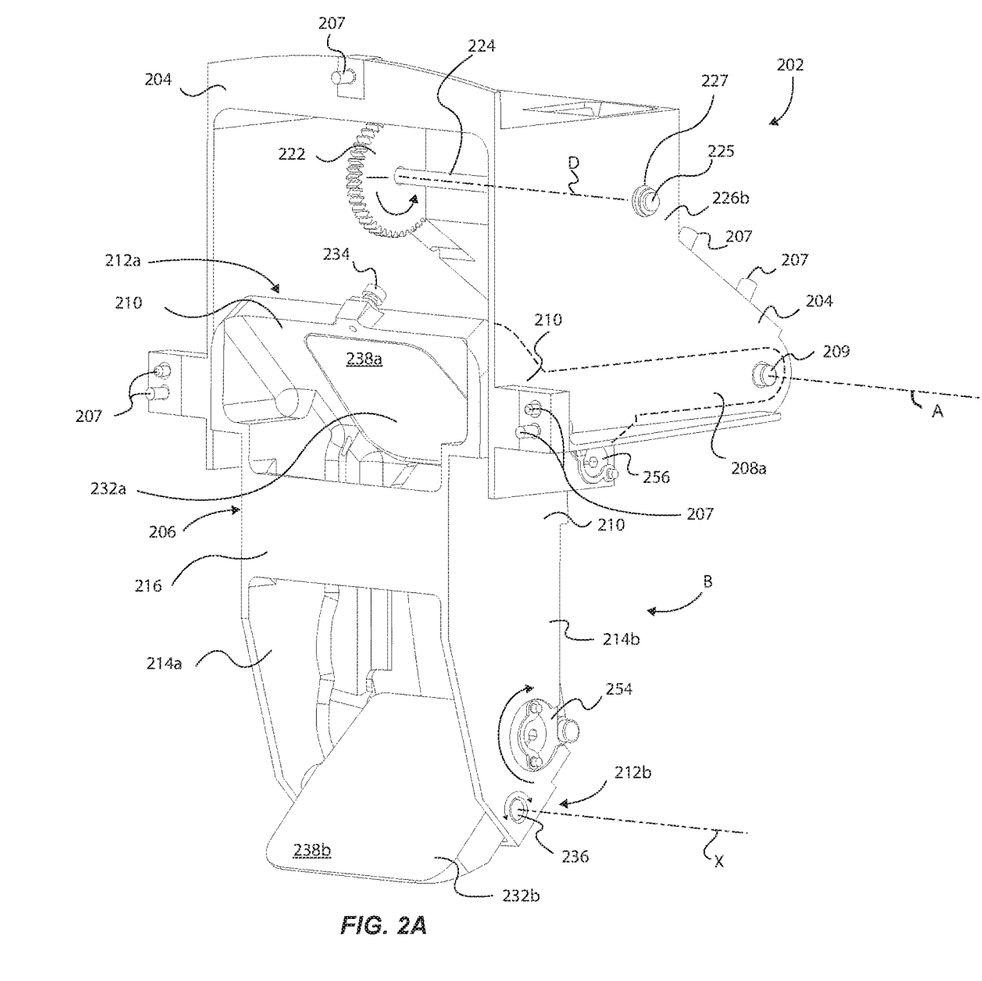
FIG. 2A is a front right isometric view of a field-of-view switch assembly in a bypass position in accordance with an example of the present disclosure.
Figure 2B:
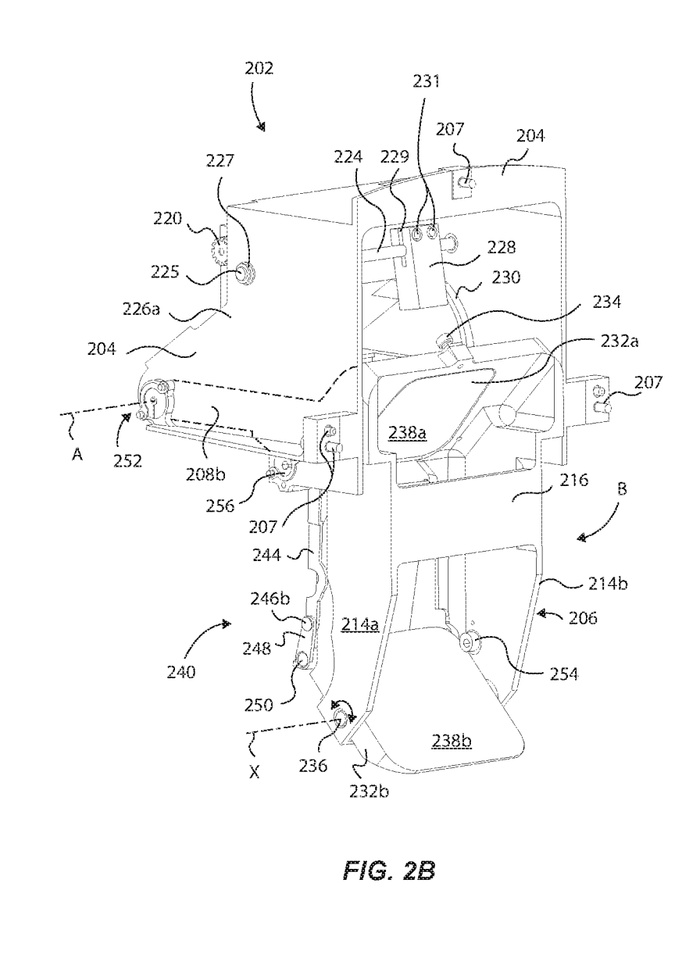
FIG. 2B is a front left isometric view of the field-of-view switch assembly of FIG. 2A.
Figure 2C:
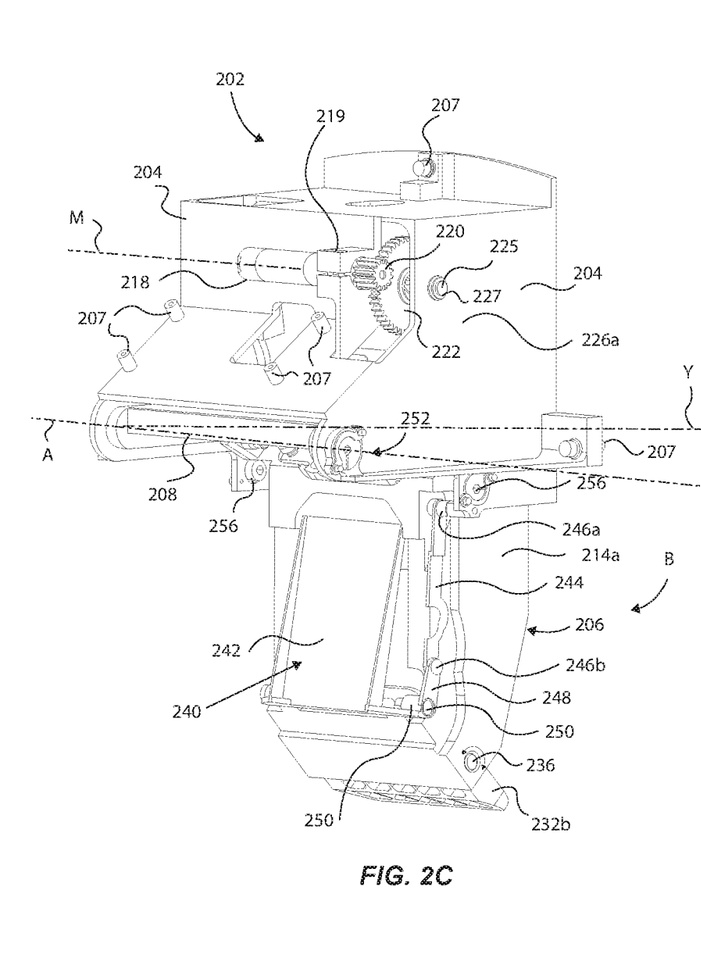
FIG. 2C is a rear right isometric view of the field-of-view switch assembly of FIG. 2A.
Figure 3A:
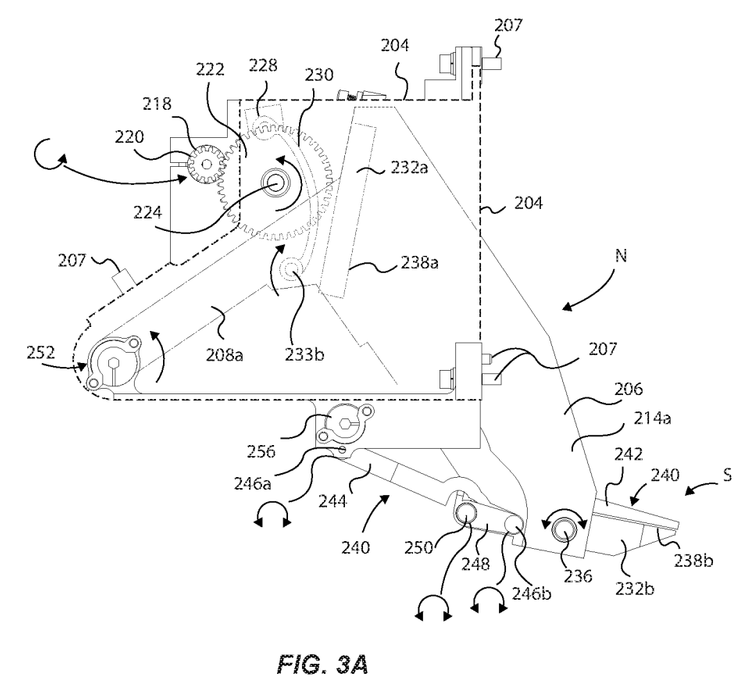
FIG. 3A is a left side view of the field-of-view switch assembly of FIG. 2A in a non-bypass position.
Figure 3B:
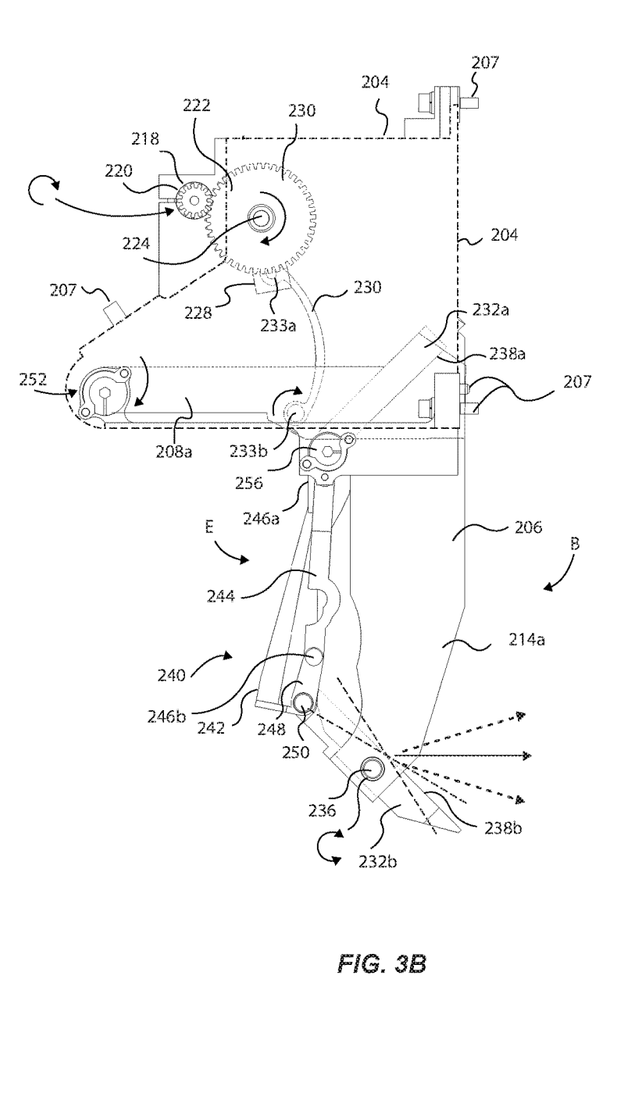
FIG. 3B is a left side view of the field-of-view switch assembly of FIG. 2A in the bypass position.
Figure 3C:
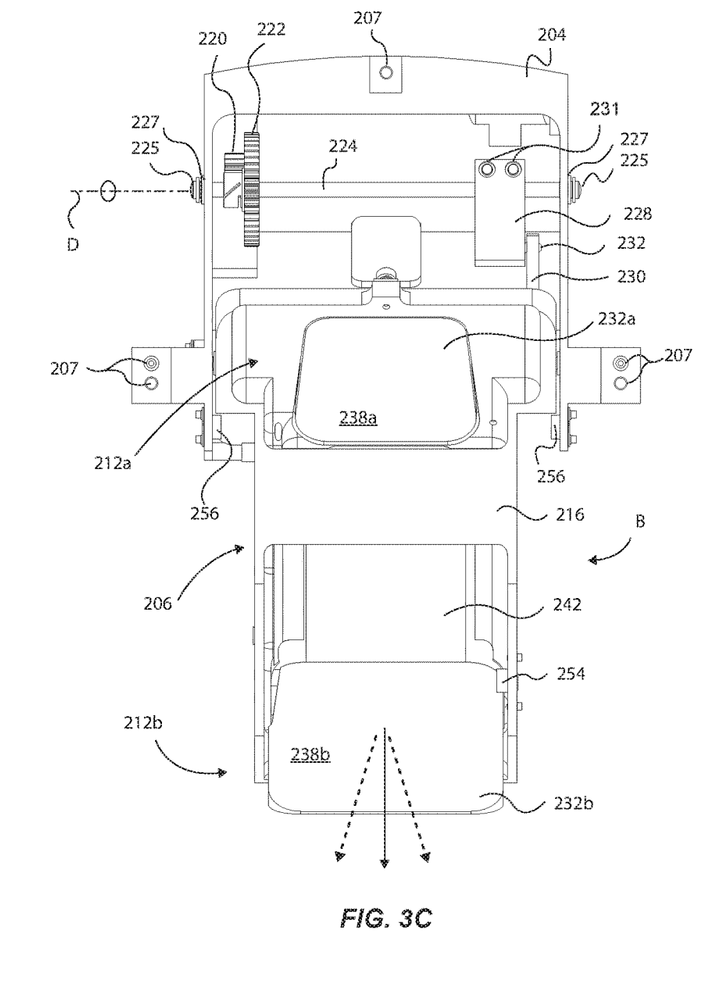
FIG. 3C is a front view of the field-of-view switch assembly of FIG. 2A in the bypass position.
Figure 4A:
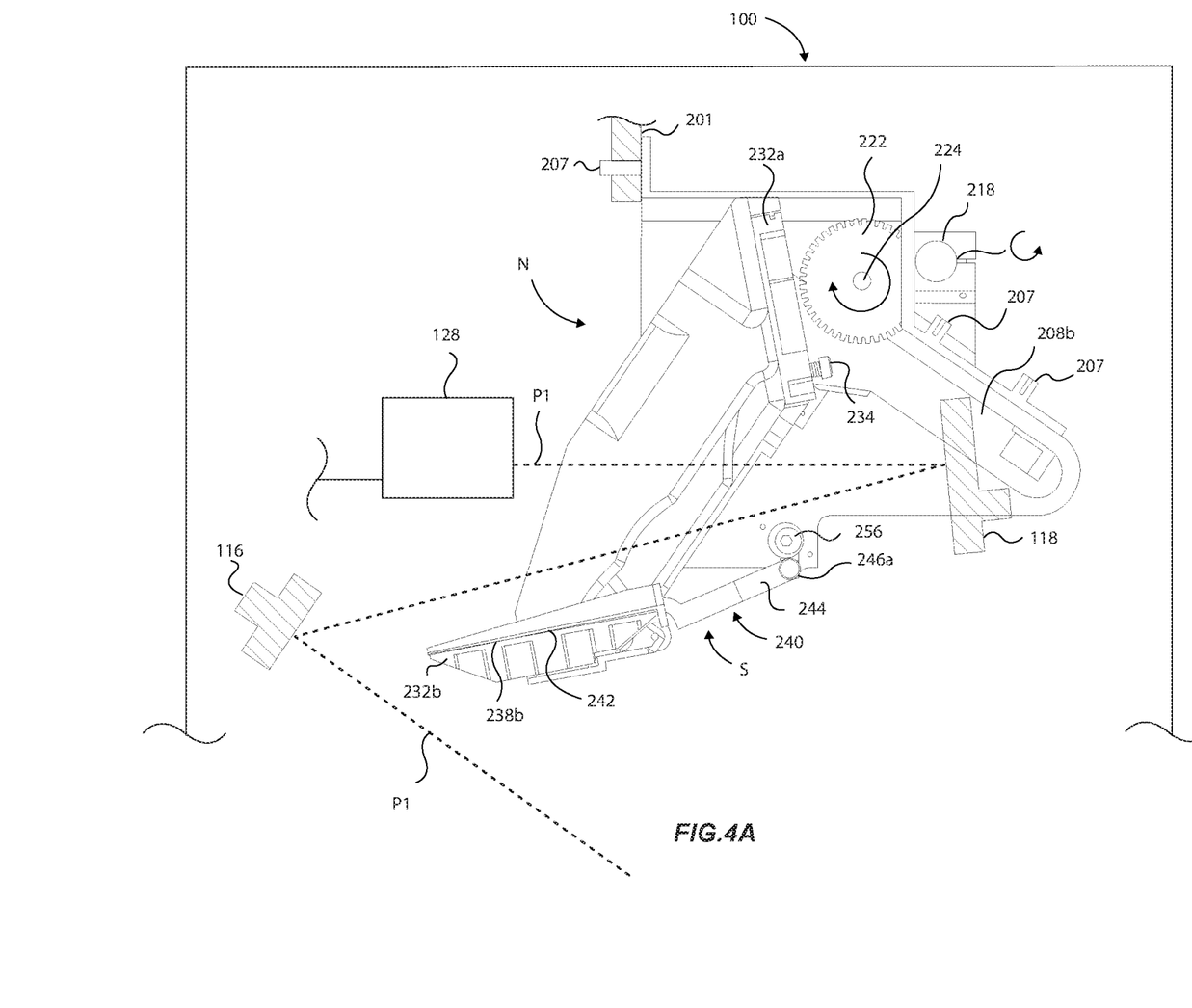
FIG. 4A is a right side cross sectional view of the field-of-view switch assembly of FIG. 2A in the non-bypass position.
Figure 4B:
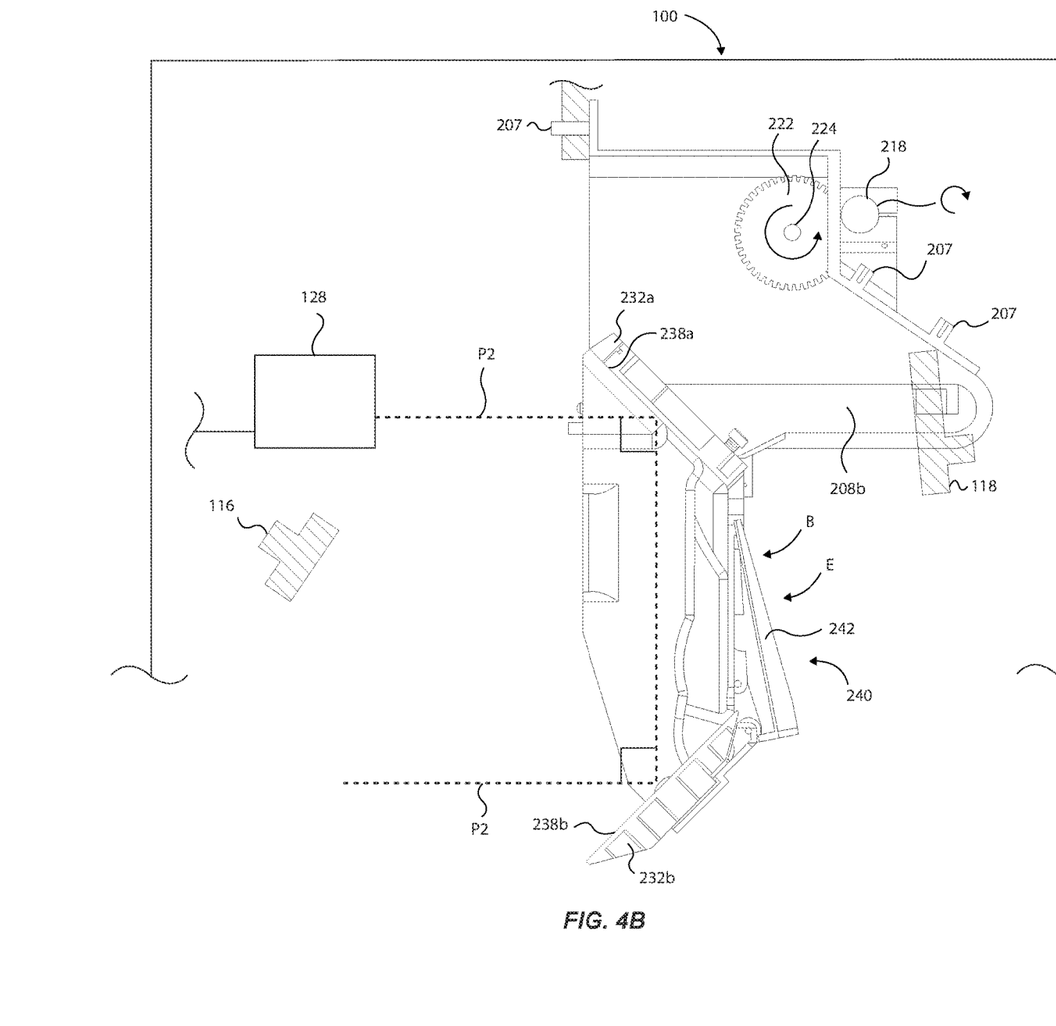
FIG. 4B is a left side cross sectional view of the field-of-view switch assembly of FIG. 2A in the bypass position.

FIGS. 2A-4B show various views of a field-of-view switch assembly 202, as one example implementation of the field-of-view switch assembly 102 of the system 100 (see also FIGS. 1A and 1B). Specifically, FIG. 2A shows a front right isometric view; FIG. 2B shows a front left isometric; and FIG. 2C shows a rear right isometric view (all showing the field-of-view switch assembly 202 in the bypass position B). FIG. 3A is a left side view of the field-of-view switch assembly in a non-bypass position; FIG. 3B is a left side view of the field-of-view switch assembly in the bypass position; FIG. 3C is a front view of the field-of-view switch assembly in the bypass position; FIG. 4A is a right side cross sectional view of the field-of-view switch assembly in the non-bypass position; and FIG. 4B is a left side cross sectional view of the field-of-view switch assembly in the bypass position.

The field-of-view switch assembly 202 can comprise a support structure 204 attached to a portion of a reflective telescope, for example (see FIGS. 2A and 3A). In this manner, the support structure 204 can be secured to a chassis 201 or other support structure of a reflective telescope of the optical system 100 (e.g. see FIG. 4A), which is further discussed below. The field-of-view switch assembly 202 can comprise a mount 206 movably coupled to the support structure 204. In one aspect, the mount 206 can be pivotally coupled to the support structure 204 about a retainer pin 209 (FIG. 2A) and an azimuth cam 252 (FIGS. 2B, 2C, 3A, 3B) that collectively facilitate pivotal coupling of the mount 206 relative to the support structure 204 about axis A (to further understand such pivotal movement, compare the positions of the mount 206 among FIGS. 3A-4B). The retainer pin 209 can be part of an inner race flange bearing configuration between the mount 206 and the support structure 204, for instance. Other suitable coupling devices can be used to facilitate said pivotal movement.

The support structure 204 can comprise a pair of parallel arms 208a and 208b that extend from a body section 210 of the mount 206 (e.g., FIGS. 2A and 2B). The body section 210 can comprise an upper support region 212a and an opposing lower support region 212b, and a pair of parallel side panels 214a and 214b formed between the upper and lower support regions 212a and 212b. A lateral cross member 216 is formed between the side panels 214a and 214b to provide structural stability for the mount 206 and the attached mirrors (see discussion below). Although not illustrated in FIGS. 2A-2C, the support structure 204 can be secured to the chassis 201 (FIG. 4A) via a plurality of attachment devices 207 of the support structure 204 of the field-of-view switch assembly 202. These attachment devices 207 can be threaded fasteners, bolts, alignment pins, threaded pins or other suitable devices that can be implemented to attach a sub-assembly housing/frame to a system telescope chassis, for example.

The field-of-view switch assembly 202 can comprise a four-bar linkage mechanism to facilitate actuation of the mount 206 between the non-bypass position N (FIGS. 3A and 4A) and the bypass position (FIGS. 2A-2C, 3B, and 4B). An on-board gearmotor 218 can be attached to the support structure 204 and, although not intending to be limiting in any way, can comprise a drive gear 220 rotatably interfaced (e.g., by gear teeth, belts, pulleys, etc.) to a driven gear 222. The on-board gearmotor 218 (e.g., an electric motor with integral gearbox and armature encoder) can be clamped to the support structure 204 with a fastener 219 (FIG. 2C). Notably, the on-board gearmotor 218 can be attached directly to the switch assembly 202, which reduces or minimizes impact forces on the internal components of the gearmotor 218, for instance.

The drive gear 220 can be a metallic pinion gear and the driven gear 222 can be a plastic gear with a clamping nub that interfaces with the drive gear 220 in a typical manner. A torsional shaft 224 can be secured to the driven gear 222 and can be rotatably coupled at one end of the torsional shaft 224 through bearing 227 on left side 226a of the support structure 204 and retained with a screw 225 or other retaining device (FIG. 2C). The other end of the torsional shaft 224 can similarly be rotatably coupled to the support structure 204 through a bearing 227 of a right side 226b of the structural support 204 and retained with a similar screw 225 (FIG. 2A). The torsional shaft 224 can be comprised of metal (or plastic) that is suitably shaped and sized an elongated rod) and that acts as a torsion spring to absorb energy when the mount 206 is actuated (see further discussion below).

A crank device 228 can be clamped (or otherwise attached) via a slot 229 that receives the torsional shaft 224 (FIG. 2B) at an opposing end of the torsional shaft 224 from the driven gear 222. The crank device 228 can be clamped to the torsional shaft 224 by a pair of fasteners 231 (e.g., bolts and nuts, threaded bolt, etc.). In this way, the crank device 228 is adjustable longitudinally along the shaft 224. Notably, the crank device 228 is positioned distally from the driven gear 222 along the length of the torsional shaft 224. In this configuration, the torsional shaft 224 is allowed to act as a torsional spring where a rotational torque/force is exerted on one end (driven gear 222), and a resistance torque/force is exerted on the other end (by the crank device 228). Thus, an amount of energy is absorbed by the torsional shaft 224 when the driven crank device 228 impacts its travel stops 256. This facilitates operation of the on-board motor 218 at maximum power capacity to minimize switching duration times of the mount 206 and attached diverter mirrors 232a and 232b. For example, a range of maximum power of the on-board motor 218 can be between 1 and 3 Watts, and the switching duration time can be between 0.75 and 2.0 seconds.

The torsional spring rate is controlled by the diameter of the shaft 224. Spring rate is determined the intermittent load rating of the gearmotor 218. The spring rate is reduced so that the kinetic energy of the gearmotor armature running a no-load speed is equal to the wound up torsion shaft potential energy just as the armature angular velocity is decelerated to zero and the torque specification is not exceeded.

A spring link 230 can be rotatably coupled between the crank device 228 and the mount 206 about two degrees of rotational movement (FIGS. 3A and 3B). Specifically, the spring link 230 can have an aperture at one end that is rotatably coupled to a pin 233a of the crank device 228. And, the other end of the spring link 230 can have an aperture that is rotatably coupled to the mount 206 in a similar manner. That is, the mount 206 can have a pin 233b that rotatably receives the aperture of the other end of the spring link 230, as illustrated by the rotation arrow adjacent pin 233b on FIG. 3A and on FIG. 3B. The spring link 230 can be comprised of a rigid or semi-rigid material (e.g., certain metals like steel, aluminum, or glass filled plastic etc.) and can be shaped in an arc toward the front of the switch (FIG. 3B) to provide an amount of deflection or compliance that generates a "spring effect" that locks the crank device 228 against its travel stop 256 when the mount 206 is in either bypass or non-bypass positions.

Thus, the four-bar linkage mechanism can comprise respective interface/linkage positions of the drive gear 220, driven gear 222, the torsional shaft 224, the crank device 228, and the spring link 230. When in the non-bypass position N (FIG. 3A, where the mount 206 is positioned upwardly/vertically relative to the support structure 204), the on-board gearmotor 218 can be activated and caused to rotate the drive gear 220 in a counter-clockwise manner, as shown by the arrow associated with the drive gear 220 on FIG. 3A. In this manner, the on-board gearmotor 218 can be an electric motor electrically controlled by an electronics controller (not shown) and electrically coupled to a power source (e.g., a battery, or other power source) of are overall telescope system, for example. The electronics controller can be controlled by a human operator, or by a computer system that causes the electronics controller to activate the on-board gearmotor 218 (i.e., rotate the drive gear 220 in either rotational directions). Therefore, counter-clockwise rotation of the drive gear 220 (about axis M; see FIG. 2C) causes clockwise rotation (FIG. 3A) of the driven gear 222 about axis D (as shown by the rotational arrows associated with driven gear 222 of FIGS. 2A, 3A, and 3B). Such rotation of the driven gear 222 causes similar clockwise rotation of the torsional shaft 224 (also about axis D, because the torsional shaft 224 is concentric with the driven gear 222). As a result, the crank device 228 is rotationally moved downwardly about axis D, which causes downward and rotational movement of the spring link 230, which then causes downward rotational movement of the mount 206 about axis A (FIGS. 2A-2C) (in a planar four-bar linkage configuration). Conversely, when the field-of-view switch assembly 202 is in the bypass position B (FIGS. 2A-2C, 3B, 3C, and 4B, where the mount 206 is positioned downwardly relative to the support structure 204), the on-board gearmotor 218 can be caused to rotate clockwise, which causes the mount 206 to rotate upwardly to the non-bypass position N, in an opposite manner as described above with utilizing the components of the four-bar linkage mechanism.

With continued reference to FIGS. 2A-4B, a first diverter mirror 232*a* can be attached to or otherwise supported about the mount 206 about the upper support portion 212*a*, and a second diverter mirror 232*b* can be attached to or otherwise supported about the mount 206 about the lower support portion 212*b*. In one aspect, the first diverter mirror 232*a* can be secured to the mount 206 by compliant fasteners 234 on a back side of the first diverter mirror 232*a* (FIGS. 2A, 2B, and 4A). The compliant fasteners 234 can be a suitable mirror fastener with a coil spring coupled between the fastener head and the mirror to minimize mirror surface figure change to manufacturing imperfections in the mating surfaces, for instance. The second diverter mirror 232*b* can be pivotally coupled to the lower support portion 212*b* about mounting devices 236 (shoulder screw retained ball bearing) on either side of the second diverter mirror 232*b*, as illustrated by the rotational arrows associated with mounting device 236 of FIGS. 3A and 3B. The mounting devices 236 can each be rotatably received through apertures of the mount 206 and attached to the mirror 232*b* through bores or other suitable attachment features of the mirror. In one example, each mounting device 236 can be part of an inner race flange bearing arrangement between the mount 206 and the second diverter mirror 232*b*.

The first diverter mirror 232*a* can have a reflective surface 238*a* and the second diverter mirror 232*b* can have a reflective surface 238*b*. The first diverter mirror 232*a* can be mounted at an angle such that its reflective surface 238*a* is optically incident with the reflective surface 238*b* of the second diverter mirror 232*b* (e.g., the mirrors can be nominally mounted at approximately a 90 degree angle relative to their reflective surfaces). Each mirror can be any suitable mirror, such as an optical mirror comprised of aluminum or other mirrors used in high-magnification telescope systems, for example.

A dynamic shutter 240 can be movably coupled to the mount 206 and can be configured to shield the reflective surface 238*b* from stray light rays when the mount 206 is moved to the non-bypass position N. The dynamic shutter 240 can also be configured to expose the reflective surface 238*b* of the second diverter mirror 232*b* when the mount 206 is moved to the bypass position B. Specifically, the dynamic, shutter 240 can comprise a non-reflective shielding panel 242 that covers the reflective surface 238*b* when in the non-bypass position N. As such, the shielding panel 242 does not have to cover surface area the same or larger than that of the second diverter mirror 232*b* (see FIGS. 2C and 3C); it only needs to be large enough prevent stray light for the non-bypass position. An elongated link member 244 can be pivotally linked between the mount 206 and the dynamic shutter 240 to facilitate rotational movement of the dynamic shutter 240 when the mount 206 is actuated (FIGS. 2B-3B and 4A).

More specifically, the elongated link member 244 can have a first end 246*a* (FIGS. 2C and 4A) with an aperture pivotally coupled to the structural support 204 by a shoulder screw arrangement through said aperture (or via other suitable devices that retain and facilitate rotational movement of the ink member 244 about the structural support 204). This facilitates rotation of the first end 246*a*, as shown by the rotational arrows associated with the first end 246*a* on FIG. 3A. A second end 246*b* of the elongated link member 244 can be pivotally coupled to a pivot portion 248, formed of the dynamic shutter 240 (see FIGS. 2B, 2C, 3A, and 3B). This facilitates rotation of the second end 246*b*, as shown by the rotational arrows associated with the second end 246*b* on FIG. 3A. The pivot portion 248 can be formed with and extend from the dynamic shutter 240 in a direction along a length of the shielding panel 242. The pivot portion 248 can comprise a cylindrical protrusion that rotatably receives an aperture at the second end 246*b* (is retained by a pan head screw) of the elongated link member 244 to allow pivotal movement between the dynamic shutter 240 and the link device 244, as illustrated by the rotational arrows associated with the pivot portion 248 of FIG. 3A. The pivot portion 248 (of the dynamic shutter 240) comprises an aperture that receives a mounting device 250 (e.g., a shoulder screw) that retains and pivotally couples the dynamic shutter 240 to the mount 206 adjacent the second diverter mirror 232*b* (FIGS. 2C, 3A, and 3B). The mounting device 250 can be a shoulder screw fastener that is fastened through a bore in the mount 206 and rotational coupled to the pivot portion 248 about its aperture, as illustrated on FIG. 2C.

Accordingly, when the mount 206 is moved from the non-bypass position N (FIG. 4A) to the bypass position B (FIG. 4B), the elongated link member 244 is caused to rotate downwardly relative to the support structure 204 (about end 246*a* of link member 244). This causes a pulling force on the pivot portion 248 (of the dynamic shutter 240) that rotates it upwardly relative to the link member 244, which therefore concurrently rotates the shielding panel 242 upwardly and away from the reflective surface 238*b* of the second diverter mirror 232*b* to expose the reflective surface 238*b* to light rays. Advantageously, the dynamic shutter 240 is automatically moved between a shielding position S and a mirror exposing position B (e.g., FIGS. 4A and 4B). Thus, rotational movement of the dynamic shutter 240 occurs automatically by virtue of activating and rotating the mount 206.

Turning to the optics of the field-of-view switch assembly 202, when in the non-bypass position N (FIG. 4A) the first diverter mirror 232*a* and the second diverter mirror 232*b* can be supported such that they straddle the optical path P1 (e.g., see also discussion of FIG. 1A). In this example, the first diverter mirror 232*a* can be positioned spatially and vertically above the optical path P1, and the second diverter mirror 232*b* can be positioned spatially and vertically below the optical path P1 (although the mirrors can straddle the optical path about any three dimensional orientation on any sides of the path). This "straddle" configuration allows for a more compact field-of-view switch mechanism compared to systems that do not have a pair of diverter mirrors on either side of an optical path. Therefore, the diverter mirrors 232*a* and 232*b* allow beams (not shown here, but see FIG. 1A) of the optical path P1 to be reflected from the second flat mirror 116 to the tertiary mirror 118, and ultimately to the camera 128 (see FIGS. 1A and 4A) (both mirrors 116 and 118 are shown schematically and "in space" for illustration purposes, but they would be attached to a telescope system in a suitable manner for statically mounting precision mirrors, for example). Thus, in comparison of the views of FIGS. 4A and 4B, when the mount 206 is rotated downwardly (as discussed above), the first diverter mirror 232a is caused to be positioned within, and blocks light rays of, the beams defining the optical path P1. Concurrently, the dynamic shutter 240 is automatically rotated upwardly, thereby moving the shielding panel 242 away from the reflective surface 238b of the second diverter mirror 232b to uncover and expose the reflective surface 238b. The second diverter mirror 232b, being in a position and angle directed toward the single window 104, reflects beams (e.g., from a wide field of view) upwardly at approximately 90 degrees toward the first diverter mirror 232a. From here, the first diverter mirror 232a reflects beams to the camera 128 at approximately 90 degrees relative the direction of the beams incident on the first diverter mirror 232a from the second diverter mirror 232b (see the "90 degree" symbols of FIG. 4B). Therefore, in this example, the field-of-view switch assembly 202 can be configured to vertically translate and redirect the optical path approximately 180 degrees when in the bypass position B, and through the single window 104 (FIG. 1B).

In one example, the field-of-view switch assembly 202 comprises an azimuth cam 252 coupled between the mount 206 and the support structure 204 about the left side 226a at the left parallel arm 208a of the mount 206 (FIGS. 2C, 3A, and 3B). The azimuth cam 252 is an adjustment device and is configured to facilitate adjustment of the mount 206 and the diverter mirrors 232a and 232b in azimuth (for illustration, see the azimuth adjustment arrows on the second diverter mirror 232b of FIG. 3C). Azimuth cams are well known and will not be discussed in great detail. Regardless, the azimuth cam 252 can have an off-center axis body that is adjustable by an operator using a tool to loosen the azimuth cam 252, wherein the mount 206 can be set to a desired azimuth angle about the azimuth cam 252, and then the azimuth cam 252 tightened to ready the mount 206 for use. Thus, axis A of the mount 204 can be adjusted in two directions (x and y directions), as exemplified by the dashed center lines of axis Y on FIG. 2C, to adjust for azimuth of the mount 204 and its diverter mirrors.

Likewise, an elevation cam 254 can be secured to the right side panel 214a of the mount 206 and positioned through an aperture of the mount 206 adjacent the reflective surface 238b of the second diverter mirror 232b (FIGS. 2A, 2B, and 3C). The second diverter mirror 232b is pivotally mounted to the mount 206 (as discussed above) about a central axis X of the second diverter mirror 232b by mounting pins 236 (FIGS. 2A and 2B) on either side of the second diverter mirror 232b, such that the second diverter mirror 232b is pivotable about axis X (FIG. 2B) to adjust for elevation of the second reflective surface 238b (see FIG. 3B, showing dashed surface lines of the second reflective surface 238b, illustrating possible elevation adjustment positions of the mirror). The elevation cam 254 can have an off-center axis body that can be loosened and rotated (like the azimuth cam), which causes a radial surface of the cam 254 to contact or bias the reflective surface 238b in a desired direction (down or up), which causes the second diverter mirror 232b to pivot upwardly or downwardly to a desired elevation angle. Then the elevation cam 254 can be tightened and set to its desired position for alignment of the second diverter mirror 232b (as illustrated by the arrow adjacent cam 254 on FIG. 2A). The mirror elevation position uses a spring to preload the mirror 232b against the adjustment cam 254.

Preloaded helical coils or other types of springs or spring-like members (not shown) can be incorporated in each of the azimuth cam 252 (FIG. 2B) and the retainer pin 200 (FIG. 2A) at locations between the mount 206 and the support structure 204 in a manner to cause axial preloaded forces against the mount 206 to create a duplex pair-type bearing using deep groove radial contact bearings. Likewise, similar preloaded helical coil or other types of springs or spring-like members can be incorporated at the side interfaces (about mounting pins 236) between the mount 206 and the second diverter mirror 232b in a manner to cause axial preloaded forces against the mirror 232b to create a duplex pair-type bearing using deep groove radial contact bearings. Similar springs can be used in conjunction with the rotational mounting interface between the mount 206 and the support structure 204 when adjusting the azimuth cam 252 to cause a biasing force against the force of an individual rotating the azimuth cam 252. Adjustment devices, such as azimuth and elevation cams are known in the industry and will not be discussed in greater detail, but it will be appreciated that the azimuth and elevation cams 252 and 254 are adjustable by an operator for boresight adjustment of the second diverter mirror 232b to a desired position in both azimuth and elevation, as illustrated by the boresight arrows of FIGS. 3B and 3C of the second diverter mirror 232b.

Stop members 256 may be attached to the support structure 204 (e.g., through apertures) about various locations through walls or panels of the support structure 204, as shown on FIGS. 2A-3C. The stop members 256 can each extend inwardly towards the center of the support structure 204 to act as stops against the mount 204 when actuated to the bypass position B. The stop members 256 can have an adjustable off-center axis body for adjustment (i.e., to account for any azimuth adjustments of the azimuth cam 252).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An optical system comprising:
   a single window;
   a detector;
   an optical assembly comprising a plurality of mirrors that reflect light rays through a first optical path to the detector to translate a first field-of-view;
   a field-of-view switch assembly, comprising:
      a mount movably coupled to the optical assembly, the mount being selectively movable between a non-bypass position and a bypass position;
      a first diverter mirror attached to the mount;
      a second diverter mirror attached to the mount, wherein the first and second diverter mirrors are configured to bypass the first field-of-view and translate a second field-of-view when moved from the non-bypass position to the bypass position, thereby redirecting the light rays via the first and second diverter mirrors through a second optical path to the detector, such that the light rays through the second optical path are translatable through the single window directly to the second diverter mirror, then directly to the first diverter mirror, and then directly from the first diverter mirror to the detector; and
      a dynamic shutter movably coupled to the mount, wherein the dynamic shutter is configured to shield a reflective surface of the second diverter mirror from stray light rays when in the non-bypass position, and to expose the reflective surface when in the bypass position,
   wherein both the first field-of-view and the second field-of-view are through the single window, and wherein, when in the bypass position, the first diverter mirror is positionable within the first optical path, such that the first diverter mirror operates to block light rays associated with the first field-of-view from being reflected to the detector.

2. The system of claim 1, wherein one of the first and second fields-of-view is a narrow field of view, and the other of the first and second fields-of-view is a wide field-of-view.

3. The system of claim 1, wherein the first and second diverter mirrors straddle the first optical path when in the non-bypass position.

4. The system of claim 1, wherein a back side of the second diverter mirror is positionable to block light rays associated with the first field-of-view from being reflected to the detector.

5. The system of claim 1, wherein the dynamic shutter is pivotally coupled to the mount adjacent the second diverter mirror, wherein the dynamic shutter is further configured to automatically rotate away from the reflective surface when the mount is moved to the bypass position, and to automatically rotate toward the reflective surface to cover the reflective surface when the mount is moved to the non-bypass position.

6. The system of claim 1, wherein the field-of-view switch assembly further comprises a support structure, wherein the mount is pivotally coupled to the support structure, and wherein the field-of-view switch assembly further comprises an on-board motor attached to the support structure and configured to actuate the mount between the non-bypass position and the bypass position.

7. The system of claim 6, wherein the field-of-view switch assembly comprises a torsional shaft operably coupled to the on-board motor and configured to rotate the mount when actuated by the on-board motor, wherein the torsional shaft is operable to absorb impact forces acting on the on-board motor, thus facilitating operation of the on-board motor at maximum power capacity to minimize switching duration times of the mount and attached diverter mirrors.

8. The system of claim 1, wherein the field-of-view switch assembly comprises an azimuth cam coupled to the mount, the azimuth cam comprising an offset axis body for azimuth adjustment of the mount and the first and second diverter mirrors.

9. The system of claim 1, wherein the field-of-view switch assembly comprises an elevation cam having an offset axis body operably coupled to the second diverter mirror for elevation adjustment of the second diverter mirror.

10. The system of claim 1, wherein reflective surfaces of the first and second diverter mirrors, when in the bypass position, are positioned to vertically translate the second optical path approximately 180 degrees to the detector, such that reflective surfaces of the first and second diverter mirrors are each positioned to translate the second optical path approximately 90 degrees.

11. The system of claim 1, wherein the field-of-view switch assembly comprises a four-bar linkage drive mechanism configured to rotate the mount via a torsional shaft between the bypass and non-bypass positions.

12. The system of claim 1, wherein the optical system is a high-magnification telescope.

13. A method for facilitating switching between a first field-of-view and a second field-of-view, both through a single window, with a field-of-view switch assembly, the method comprising:
   facilitating translation of light rays with a plurality of mirrors to a detector of an optical system to translate a first field-of-view, wherein a first optical path is defined by the light rays through the single window;
   facilitating switching between the first field-of-view and a second field-of-view, both through the single window, with a field-of-view switch assembly of the optical system to redirect the first optical path, thereby redirecting the light rays via first and second diverter mirrors of the field-of-view switch assembly through a second optical path to the detector, such that the light rays through the second optical path are translated through the single window directly to the second diverter mirror, then directly to the first diverter mirror, and then directly from the first diverter mirror to the detector, wherein facilitating switching comprises facilitating movement of a mount of the field-of-view switch assembly, wherein the mount positions the first diverter mirror and the second diverter mirror within the first optical path when the mount is moved from a non-bypass position to a bypass position to redirect the first optical path to the second optical path; and facilitating shielding a reflective surface of the second diverter mirror from stray light rays with a dynamic shutter when the mount is moved to the non-bypass position, and facilitating exposing the reflective surface with the dynamic shutter when the mount is moved to the bypass position.

14. The method of claim 13, further comprising facilitating absorbing impact forces exertable on an on-board motor with a torsional shaft of the field-of-view switch assembly when moving the mount between the non-bypass and bypass positions, wherein the torsional shaft is rotatably coupled to the mount and driven by the on-board motor to rotate the mount.

15. The method of claim 13, wherein facilitating switching further comprises facilitating redirection of the first optical path to the second optical path approximately 180 degrees with the first and second diverter mirrors when in the bypass position.

16. The method of claim 13, further comprising facilitating straddling the optical path with the first and second diverter mirrors when in the non-bypass position.

17. The method of claim 13, wherein facilitating switching further comprises facilitating actuation of the mount via a four-bar linkage drive mechanism of the optical switch assembly to pivot the mount between the non-bypass and bypass positions.

18. An optical system comprising:
a detector;
an optical assembly comprising a plurality of mirrors that reflect light rays through a first optical path to the detector to translate a first field-of-view; and
a field-of-view switch assembly, comprising:
a mount movably coupled to the optical assembly, the mount being selectively movable between a non-bypass position and a bypass position;
a first diverter mirror attached to the mount;
a second diverter mirror attached to the mount and having a reflective surface, wherein the first and second diverter mirrors are configured to bypass the first field-of-view and translate a second field-of-view when moved from the non-bypass position to the bypass position, thereby redirecting the light rays via the first and second diverter mirrors through a second optical path to the detector; and
a dynamic shutter movably coupled to the mount, wherein the dynamic shutter is operable to automatically rotate away from the reflective surface of the second diverter mirror to expose the reflective surface of the second diverter mirror when the mount is moved to the bypass position, and operable to automatically rotate toward the reflective surface of the second diverter mirror to cover the reflective surface of the second diverter mirror when the mount is moved to the non-bypass position.

19. The system of claim 18, wherein both the first field-of-view and the second field-of-view are through the single window.

20. The system of claim 18, wherein the dynamic shutter comprises a shielding panel pivotally coupled to the mount, the system further comprising a support structure in support of the field-of-view switch assembly, wherein a link member is pivotally coupled to the support structure and pivotally coupled to the shielding panel, such that the link member facilitates automatic rotation of the shielding panel in response to the mount moving between the non-bypass and bypass positions.

21. The system of claim 18, wherein reflective surfaces of the first and second diverter mirrors, when in the bypass position, are positioned to vertically translate and redirect the optical path approximately 180 degrees relative to the redirected optical path and the detector, such that each reflective surface is positioned to translate the second optical path approximately 90 degrees.

22. An optical system comprising:
a single window;
a detector;
an optical assembly comprising a plurality of mirrors that reflect light rays through a first optical path to the detector to translate a first field-of-view;
a field-of-view switch assembly, comprising:
a mount movably coupled to the optical assembly, the mount being selectively movable between a non-bypass position and a bypass position;
a first diverter mirror attached to the mount; and
a second diverter mirror attached to the mount, wherein the first and second diverter mirrors are configured to bypass the first field-of-view and translate a second field-of-view when moved from the non-bypass position to the bypass position, thereby redirecting the light rays via the first and second diverter mirrors through a second optical path to the detector, such that the light rays through the second optical path are translatable through the single window directly to the second diverter mirror, then directly to the first diverter mirror, and then directly from the first diverter mirror to the detector,
wherein both the first field-of-view and the second field-of-view are through the single window, and wherein, when in the bypass position, the first diverter mirror is positionable within the first optical path, such that the first diverter mirror operates to block light rays associated with the first field-of-view from being reflected to the detector, and
wherein reflective surfaces of the first and second diverter mirrors, when in the bypass position, are positioned to vertically translate the second optical path approximately 180 degrees to the detector, such that reflective surfaces of the first and second diverter mirrors are each positioned to translate the second optical path approximately 90 degrees.

23. A method for facilitating switching between a first field-of-view and a second field-of-view, both through a single window, with a field-of-view switch assembly, the method comprising:
facilitating translation of light rays with a plurality of mirrors to a detector of an optical system to translate a first field-of-view, wherein a first optical path is defined by the light rays through the single window;
facilitating switching between the first field-of-view and a second field-of-view, both through the single window, with a field-of-view switch assembly of the optical system to redirect the first optical path, thereby redirecting the light rays via first and second diverter mirrors of the field-of-view switch assembly through a second optical path to the detector, such that the light rays through the second optical path are translated through the single window directly to the second diverter mirror, then directly to the first diverter mirror, and then directly from the first diverter mirror to the detector, wherein facilitating switching further comprises facilitating redirection of the first optical path to the second optical path approximately 180 degrees with the first and second diverter mirrors when in the bypass position.

* * * * *